Patented Jan. 30, 1934

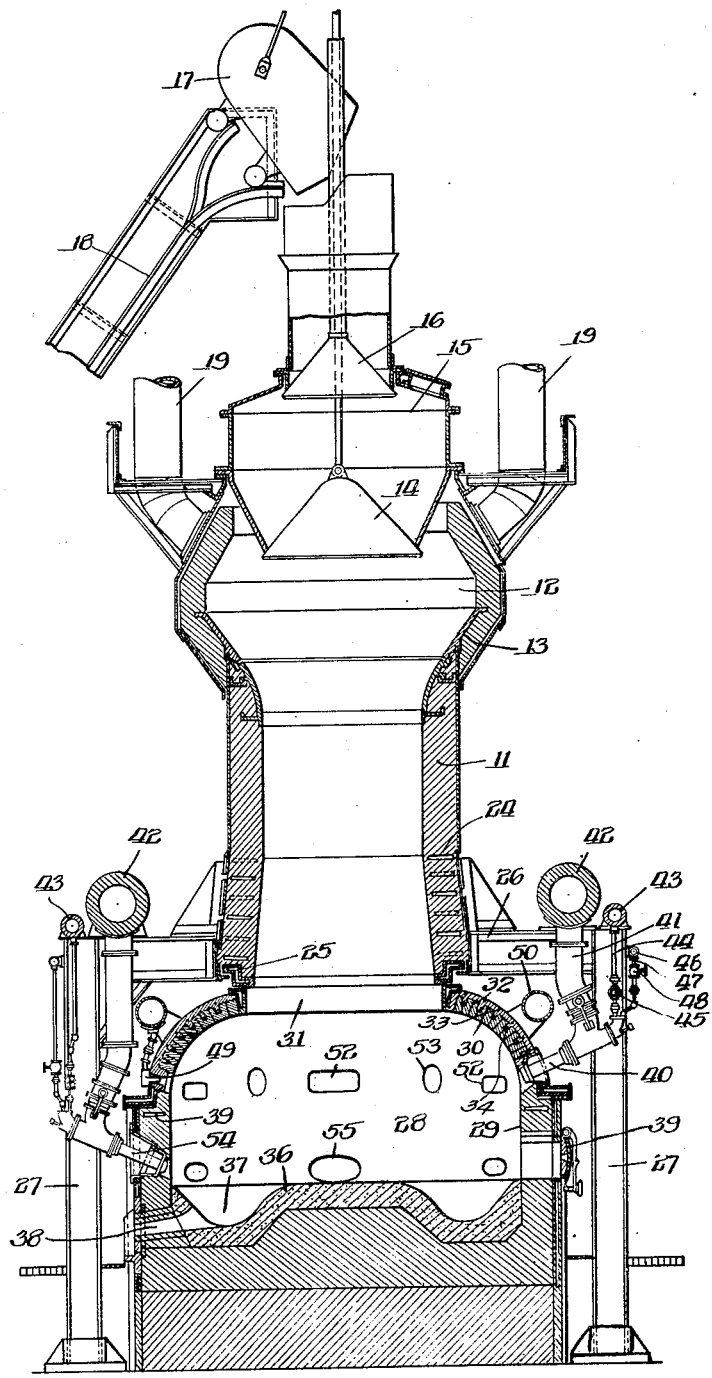

1,944,874

UNITED STATES PATENT OFFICE 1,944,874

REDUCTION OF ORES

Herman A. Brassert, Chicago, Ill., assignor to H. A. Brassert & Company, Chicago, Ill., a corporation of Illinois Application July 8, 1931. Serial No. 549,559

2 Claims. (Cl. 75—17)

This invention relates to the direct reduction of ores and melting of metals, and more particularly to the production of molten iron directly from iron ores, eliminating the charging of coke with the ore as is now commonly practiced in the manufacture of pig iron, in the iron blast furnace.

In the present art of iron and steel manufacture from iron ores, the ore is charged together with coke and limestone into the top of a blast furnace. The descending ores are preheated and reduced by the ascending gases in the upper part or shaft of the furnace which result from combustion of the coke in the hearth of the furnace. This so-called indirect method of reduction by the carbon monoxide of the gases is more economical than the direct reduction by solid carbon.

This method has, however, the objection that the blast furnace fuel must be a coke of special physical and chemical quality, and is known as metallurgical coke, which, in some localities, is difficult to procure. The present blast furnace process also has the disadvantage that the reduced iron becomes saturated with carbon up to four percent and more. This carbon must afterwards be removed at a considerable expense in the steel making process.

In the case of oxides which are more difficult to reduce than those of iron and which can only be reduced by solid carbon, as for instance, those of aluminum, silicon, manganese and chromium, the electric furnace is now commonly employed, but unless a cheap supply of electric power is available, this method is too expensive and in no case applicable to quantity production of as cheap a metal as iron. Other direct processes have been developed for the production of iron, but none of these are practical for commercial operation because they involve a series of separate successive treatments in individual units, which renders the process too expensive when considered in competition with the normal methods of production of molten iron in the blast furnace followed by conversion of the iron to steel by the Bessemer or open hearth process. The difficulty with the direct processes which have been proposed in the past is that they produce an iron sponge which still contains all of the impurities which accompany the iron in the ore. These impurities must be removed before the sponge can be used for steel making, but they are so closely associated with the iron that they are only partially removed when the usual fine grinding followed by magnetic concentration is applied. Due to the presence of these materials and the chemical composition of the iron which is produced by the ordinary sponge iron processes, it is difficult to effect an economical melting of the product. The iron produced by the sponge iron process is practically free from carbon and therefore has a high melting point which renders it difficult to melt. When the sponge iron, resulting from the direct reduction process, is melted in an electric furnace or a furnace similar to an open hearth, the impurities accompanying the iron form a slag, which forms an insulation over the metallic portion of the charge and is cause for an excessive fuel consumption. Furthermore, the product of magnetic concentration is of so fine a size that it cannot be used in melting furnaces without considerable loss of iron due to dust losses and oxidation. These losses may be reduced if the sponge iron is briquetted or sintered prior to treatment in the melting furnace, which, however, adds another expensive stage to the process. My invention obviates all of the disadvantages of present processes.

It is an object of the present invention to produce molten metal directly from oxides without charging metallurgical coke with the ore, as is present common practice.

It is a further object to provide a process for making molten steel directly from ore in one and the same furnace by a continuous process without the use of electric power.

It is an additional object to utilize the fines of fuels which by the present blast furnace processes cannot be economically consumed.

It is an additional object to provide a method for producing much higher temperatures than can now be obtained in all except electric furnaces.

It is also an object to provide a method which may be carried out by the use of equipment and apparatus which is much smaller and less expensive than that which is now used in the manufacture of iron and steel.

Other and further objects will appear as the description proceeds.

I have shown one form of furnace adapted for carrying out my improved method in the single figure constituting the accompanying drawing.

In the drawing, the furnace is provided with a shaft portion 11 and upper charging portion 12 having outwardly flaring walls 13 adapted to receive the material discharged from the lower bell 14. The usual type of charging hopper 15 is provided closed at its upper end by the upper bell 16. A charging car 17 is shown operating on the track 18. The products of combustion are led from the upper portion of the furnace through the passages 19.

The lower portion of the stack section 11 is shown as provided with a plurality of water cooled bosh plates 24, and at its lower end has a water cooled ring member 25 mounted thereon in close contact with a water cooled dome ring forming a part of the hearth portion, as hereinafter described. This stack section is supported on a metal framework 26 carried by columns 27 independently of the lower hearth section 28 of the furnace.

This enlarged hearth section 28 is provided with vertical walls 29 and inwardly inclined dome walls 30 which meet a water cooled metallic ring 31 which serves as a key for the upper edge of these walls 30. The dome walls 30 are made up of a metallic cover 32 containing integral cooling pipes 33, and with ribs 34 for holding the refractory lining 35. The metallic cover 32 may be air cooled externally if desired, all of which forms a special system of cooling which must be employed to prevent destruction of the furnace walls owing to the very high temperatures resulting from the complete combustion of the rich fuel with preheated air, preferably employed with this furnace, although all of the furnace walls are formed of refractory material of a high heat resistant character.

The dome walls 30 rest upon the vertical side walls 29 of the hearth portion 28 with the bottom 36 of the hearth portion having an annular depressed portion 37 therein in which the molten metal will accumulate, and is capable of holding a large bath of molten metal. A suitable tapping hole 38 is provided which is in communication with the depression 37 in the hearth bottom. Inspection and charging doors 39 are shown provided adjacent the metal line of the furnace, and through these doors materials may be charged or additions made if desired, for facilitating the refining of the metal or bringing it to the proper analysis, or the bottom can be repaired or remade.

Into the lower part of the dome portion 30 of the furnace an upper series of burners or tuyères 40 is provided, which are supplied with air through passages 41 leading from the bustle pipe 42. This air is preferably preheated to a high degree. The fuel is supplied to these burners 40 through the header 43 and pipes 44 controlled by valves 45. Steam for forcing the fuel into the burner may be supplied through header 46 and pipes 47 controlled by valve 48. The tuyères 40 are shown extending radially inward of the hearth portion 28 and are downwardly inclined. Intermediate the tuyères or burners 40 are shown small nozzles 49 which are supplied through the header 50 and pipes 51 with waste gases, air, steam or other cooling medium for protecting the hearth walls, dome roof, and lower stack walls against excessive heating, and also keeps these parts of the furnace sufficiently cool to prevent formation and adhesions of molten masses on the walls, thereby avoiding scaffolding. These nozzles 49 are preferably inclined tangentially of the hearth through the openings 52.

A lower set of tuyères or burners 54 are provided, which are supplied with air through the bustle pipe 42, and with fuel and steam through the headers 43 and 44 and are located on a lower level extending through the vertical side walls 29 of the hearth portion. These burners 54 are preferably located tangentially and extend through the openings 55.

In the operation of the furnace shown, in carrying out my method I do not rely on coke for fuel or for use as a reducing agent, but mix the fine ores with fine coal or coke dust. I prefer to mix these intimately by pugging or other known means of mixing. Having a proper and uniform mixture, I prefer to briquette or sinter all or part of the mixture into small briquettes or sinter, preferably egg shape and size. These I charge into the top of a shaft furnace, adding limestone or other fluxes if it is desired to flux off sulphur, phosphorus or other impurities. The fluxes may also be mixed with the fine ore and fuel in the pug mill.

The fuel for the process is injected through the tuyères or burners 40 placed in the hearth walls. This fuel may consist of liquid fuel, such as oil or tar, or solid fuel in the shape of pulverized coal or coke, or gaseous fuel such as natural or artificial gas, blast furnace or producer gas, or the like. In any case, I preheat the air preferably to a high degree, and particularly if the fuel has a low heat value I may also preheat the fuel. The intense heat from this combustion which is carried out to complete combustion, contrary to that in the hearth of a blast furnace, will heat up the hearth of the furnace to a high degree, as high as that obtained in electric furnaces, and will result in rapidly melting the reduced ore which is descending into the hearth. The obtainment of very high temperatures in the hearth of the furnace, much higher than can be obtained in present shaft furnaces and from internally charged fuel, is a principal characteristic of my invention. The reduction of the ore takes place rapidly in the shaft section due to the intimate contact between ore and fuel and due to the high activity of the carbon monoxide developed in the shaft from the reaction of the $CO_2$ and $H_2O$ resulting from combustion of the fuel below with the carbon which is mixed with the ore in the upper portion of the furnace. As the ore and carbon descend through the entire range of temperature, from lowest to highest, indirect reduction by CO is given full opportunity to take place, but direct reduction may also be accomplished in the lower sections of the stock column where the temperature range is above that which permits indirect reduction to take place.

The molten metal and slag gathered in the bottom of the hearth and bosh may be withdrawn through suitable tapping holes. Before tapping the metal, it may, if it is iron, be refined by the various steps known in the art of iron and steel manufacture. If a metal higher in carbon is desired, carbon can be added beyond that required for reduction of the ore and such carbon may be supplied with the charge at the top or it may be added through charging doors directly into the hearth. If a low carbon metal or steel is desired to be made, then an oxidizing flame may be employed in the hearth. This may be injected through the regular tuyères or burners employed for combustion of the fuel used for heating the furnace and for melting the reduced ore, or an additional flame or flames may be brought to play on the molten metal through the lower row of tuyères 54. This oxidizing treatment may consist, in case that a large amount of carbon is to be removed, in the shortest possible time, of an air blast similar to that employed in a side-blown converter or ore may be added through the charging doors for the same purpose. After the carbon is removed or reduced to the desired percentage in the steel, then a reducing atmosphere may be created in the hearth by employing a reducing flame or flames and/or by adding reducing and refining agents to the bath through the charging doors and finishing the heat of steel in accordance with well known methods.

In case of oxides which are difficult to reduce and require solid carbon for their reduction, as aluminum, silicon oxides or chromium or manganese oxides, sufficient carbon is preferably added to the charge in order to produce the condition required for complete reduction.

The difference and the advantages of this method of direct reduction of ores in comparison to all others will be clear when it is understood that here for the first time the economies of reduction in a vertical shaft by direct contact between carbon and carbon monoxide and iron oxides are carried on in the same process which melts the reduced ore, separates it from its impurities or gangue and refines the resulting metal. The known direct reduction processes which have been successful in reducing the ore have not separated the gangue from the iron sponge except by successive separate treatment, such as magnetic concentration followed by sintering or briquetting of the fines of the iron sponge and final melting in the ordinary steel furnaces. The cost of these treatments has made direct reduction non-commercial. I accomplish all of these steps, that of reduction, separation from gangue, and melting in a single process and in one apparatus. Furthermore, I save approximately one-half of the fuel required to make steel from iron ore through the ordinary blast furnace and open hearth furnace, and I have, in the case of production of such metals as aluminum, silicon and manganese, substituted the cheapest fuels for electric power.

While I have described certain preferred methods of carrying out my invention and have shown one form of apparatus adapted for use therewith, these are to be understood as illustrative only, as I contemplate such changes and modifications as come within the spirit and scope of the appended claims.

I claim:

1. The method of making molten ferrous metal, which comprises reducing iron ore by finely divided carbon while preheating the ore with waste heat derived from complete combustion of fuel injected into the melting zone, melting the reduced iron and gangue, and refining the molten metal by an oxidizing flame in the same unit.

2. The method of making molten ferrous metal, which comprises charging iron oxides, together with finely divided carbonaceous fuel into a shaft furnace, preheating the materials in the shaft of the furnace, firing the furnace with fuel injected through burners into the melting zone of the furnace, melting the reduced ore in said zone, oxidizing the molten metal by a controlled excess of preheated air injected with the fuel, and removing metalloids by impinging a blast of air on the molten bath.

HERMAN A. BRASSERT.